United States Patent
Beckhaus et al.

(10) Patent No.: US 6,332,949 B1
(45) Date of Patent: Dec. 25, 2001

(54) METHOD FOR UPGRADING USED SULFURIC ACIDS

(75) Inventors: Heiko Beckhaus, Leverkusen; Jürgen Münnig, Kaarst; Wolfgang Lorenz, Dormagen; Karl Schumacher, Leverkusen, all of (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/269,633

(22) PCT Filed: Oct. 1, 1997

(86) PCT No.: PCT/EP97/05380

§ 371 Date: Mar. 30, 1999

§ 102(e) Date: Mar. 30, 1999

(87) PCT Pub. No.: WO98/16464

PCT Pub. Date: Apr. 23, 1998

(30) Foreign Application Priority Data

Oct. 14, 1996 (DE) .............................. 196 42 328

(51) Int. Cl.$^7$ .............. B01D 1/00; C01B 17/88; C01B 17/90

(52) U.S. Cl. ............... 159/47.1; 159/DIG. 16; 159/DIG. 19; 159/31; 159/DIG. 2; 159/16.3; 203/12; 203/40; 203/42; 203/93; 203/94; 203/96; 203/41; 203/92; 203/95; 203/97; 203/98; 423/522; 423/531; 55/185; 202/197

(58) Field of Search .............. 203/12, 42, 91–98, 203/40; 159/DIG. 19, DIG. 16, 47.1, 47.3, DIG. 15, 31; 423/531, 522

(56) References Cited

U.S. PATENT DOCUMENTS

| | | | |
|---|---|---|---|
| 3,789,902 | * 2/1974 | Shah et al. | 159/DIG. 19 |
| 4,409,064 | * 10/1983 | Vora et al. | 159/47.1 |
| 4,857,281 | * 8/1989 | Beckhaus et al. | 202/267.1 |
| 5,275,701 | * 1/1994 | Mazzafro et al. | 203/12 |

OTHER PUBLICATIONS

Kirk–Othmer, Encycl. Chem. Tech., 3rd Edition, (month unavailable) 1981, vol. 15, pp. 928–929, Nitrobenzene and Nitrotoluenes.

Bodenbenner, von Plessen, Vollmüller, Dechema–Monogr. 86, (month unavailable) 1980, pp. 197–219, Das Pauling–Verfahren zur Regeneration von Abfallschwefelsaure.

* cited by examiner

Primary Examiner—Virginia Manoharan
(74) Attorney, Agent, or Firm—Joseph C. Gil; Lyndanne M. Whalen; Diderico van Eyl

(57) ABSTRACT

A process for concentrating spent sulphuric acids particularly sulphuric acids which arise during the nitration of hydrocarbons with nitric acid in the presence of sulphuric acid, wherein single- or multi-stage concentration is effected under vacuum.

2 Claims, No Drawings

METHOD FOR UPGRADING USED SULFURIC ACIDS

The present invention relates to a process for concentrating spent sulphuric acids, particularly sulphuric acids which arise during the nitration of hydrocarbons with nitric acid in the presence of sulphuric acid, wherein single- or multi-stage concentration is effected under vacuum.

In this connection, the disposal or reutilisation of spent sulphuric acid which arises during the manufacture of nitrated products constitutes a problem, since the sulphuric acid constitutes a significant proportion of the manufacturing costs in the process. Amongst other considerations, this has led to attempts to avoid the use of sulphuric acid altogether (Kirk-Othmer, Encycl. Chem. Tech., 3rd Edition 1981, Volume 15, pages 928–929).

The most widely used process for concentrating spent sulphuric acid is what is termed the Pauling process [Bodenbrenner, von Plessen, Vollmüller, Dechema-Monogr. 86 (1980), 197], in which a relatively pure 96% sulphuric acid can be recovered. The disadvantages of this process are the high specific investment costs and operating costs. Moreover, $SO_2$ and $NO_x$ by-products are formed by the oxidative destruction of part of the organic compounds.

In most vacuum concentration processes for spent sulphuric acids, the vapours also contain appreciable amounts of sulphuric acids in addition to other compounds. Despite the installation of distillation stages for separation, sulphuric acid is entrained and reoccurs in the condensate and thus in the liquid waste.

Avoiding these problems has hitherto proved to be very costly technically and economically. According to U.S. Pat. No. 4,409,064, a water film is maintained above a packing during the concentration of spent sulphuric acids and a considerable amount of water is sprayed on to a distributor in order to wash the sulphuric acid out of the vapours.

The object of the present invention was therefore to provide a technically simple process for recovering sulphuric acid as completely as possible from vapours which contain sulphuric acid, which process enables the sulphuric acid to be recovered for sulphuric acid concentration.

It has surprisingly been possible to achieve this object by the process according to the invention, by washing down the vapours during the concentration of sulphuric acid with a little water, condensate or dilute sulphuric acid.

The present invention relates to a process for concentrating spent sulphuric acids, which is characterised in that a) spent sulphuric acid is fed to an evaporator, b) this spent sulphuric acid is heated to temperatures which are sufficient for the evaporation of water under subatmospheric pressure and for the formation of a gas phase which is loaded with water vapour and which additionally contains sulphuric acid, and for a concentrated bottom product to be formed, c) the gas phase above the bottom product is brought into contact with an aqueous phase, which is provided in an amount of 10 to 1000 kg/hour, most preferably 40 to 150 kg/hour, per 1000 kg vapours/hour, so that the sulphuric acid contained in the gas phase is absorbed by the aqueous phase and a gas phase is obtained which is almost free from sulphuric acid, d) the aqueous phase which contains sulphuric acid is returned to the bottom in the form of drops which are formed on the demister which is mounted above the bottom.

Water, condensate or dilute sulphuric acid in a concentration of up to 70% by weight, most preferably 2 to 20% by weight, are preferably used as the aqueous phase.

Sulphuric acids with a concentration which is preferably 50 to 90% by weight, most preferably 65 to 85% by weight, are concentrated to a concentration of 70 to 97% by weight, more preferably to 80 to 92% by weight, most preferably to 88 to 92% by weight, in the process according to the invention.

Concentration of the spent sulphuric acids can also be combined with acid stripping as a purification stage.

The aqueous phase is preferably injected into the vapour stream above the bottom product and below the demister, in co-current flow with the vapours.

However, the aqueous phase can also be injected into the vapour stream above the bottom product in counter-current flow to the vapours (gas phase), wherein injection can be effected above or below the demister.

The process is preferably conducted at a subatmospheric pressure of 5 to 950 mbar, most preferably at 30 to 400 mbar.

The demister preferably consists of a knitted fabric, braiding, woven fabric or packing, and preferably has a thickness of 1 to 100 cm, most preferably 3 to 35 cm.

The gas phase (vapours) is preferably washed down with the aqueous phase, preferably water, so that the aqueous phase, which now contains sulphuric acid, can run off freely into the bottom (concentrated sulphuric acid).

For example, the vapours from the concentration stages, at pressures of 800 to 20 mbar, were each washed down with a little water at the top of a column, whereupon the vapours, which were at a temperature of 150° to 190° C., were cooled to about 120° C. Thus, depending on the pressure, at a vapour flow rate of 1000 kg/hour, for example, about 55 kg water/hour at 30° C. were required in order to remove the sulphuric acid from the vapours at a subatmospheric pressure of 400 mbar, about 85 kg water/hour at 30° C. were required at a subatmospheric pressure of 100 mbar, and about 110 kg water/hour at 30° C. were required at a subatmospheric pressure of 30 mbar. The water which ran off, which now contained sulphuric acid, had a sulphuric acid concentration of about 75% by weight. The spent sulphuric acid was concentrated from 78% by weight to 92% by weight in the course of this procedure. The condensates from the vapours contained the following sulphuric acid concentrations with and without washing down, respectively:

|  | without washing down | with washing down |
| --- | --- | --- |
| at 400 mbar | 2000 ppm $H_2SO_4$ | 100 ppm $H_2SO_4$ |
| at 100 mbar | 25,000 ppm $H_2SO_4$ | 500 ppm $H_2SO_4$ |
| at 30 mbar | 85,000 ppm $H_2SO_4$ | 1500 ppm $H_2SO_4$ |

What is claimed is:

1. A process for concentrating spent sulfuric acid comprising a) feeding spent sulfuric acid to an evaporator, b) heating the spent sulfuric acid to a temperature that is sufficient to cause evaporation of water under subatmospheric pressure and to form a gas phase, which is loaded with water vapor and additionally contains sulfuric acid, and to form a concentrated bottom product, c) bringing the gas phase above the bottom product into contact with an aqueous phase that is provided at a rate that ranges from about 10 to about 1000 kg/hour of aqueous phase, per 1000 kg/hour of vapors, wherein the sulfuric acid contained in the gas phase is absorbed by the aqueous phase and a second gas phase, which is substantially free from sulfuric acid is obtained, and wherein the aqueous phase is provided by injection into the gas phase below a demister in co-current flow with the gas phase, and d) returning the aqueous phase from c), which contains sulfuric acid, to the bottom in the form of drops which are formed on a demister which is mounted above the bottom.

2. A process for concentrating spent sulfuric acid comprising:

a) feeding spent sulfuric acid to an evaporator, b) heating the spent sulfuric acid to a temperature that is sufficient to cause evaporation of water under subatmospheric pressure ranging from about 5 to about 950 mbar to form a gas phase, which is loaded with water vapor and additionally contains sulfuric acid, and to form a concentrated bottom product, c) bringing the gas phase above the bottom product into contact with an aqueous phase that is provided at a rate that ranges from about 10 to about 1000 kg/hour of aqueous phase, per 1000 kg/hour of vapors, wherein the sulfuric acid contained in the gas phase is absorbed by the aqueous phase and a second gas phase, which is substantially free from sulfuric acid is obtained, and wherein the aqueous phase is provided by injection into the gas phase below a demister in co-current flow with the gas phase, and d) returning the aqueous phase from c), which contains sulfuric acid, to the bottom in the form of drops which are formed on a demister which is mounted above the bottom.

* * * * *